United States Patent
Alcaide Hernández et al.

(10) Patent No.: US 11,760,314 B2
(45) Date of Patent: Sep. 19, 2023

(54) APPARATUS FOR CLEANING A SURFACE

(71) Applicant: Fico Transpar, S.A., Barcelona (ES)

(72) Inventors: Olallo Alcaide Hernández, Viladecavalls (ES); Robert López Galera, Viladecavalls (ES)

(73) Assignee: FICO TRANSPAR, S.A., Barcelona (ES)

( * ) Notice: Subject to any disclaimer, the term of this patent is extended or adjusted under 35 U.S.C. 154(b) by 410 days.

(21) Appl. No.: 16/922,175

(22) Filed: Jul. 7, 2020

(65) Prior Publication Data

US 2021/0009085 A1    Jan. 14, 2021

(30) Foreign Application Priority Data

Jul. 8, 2019 (EP) ................................ 19382580

(51) Int. Cl.
| | |
|---|---|
| *B60S 1/56* | (2006.01) |
| *B60S 1/34* | (2006.01) |
| *B60S 1/38* | (2006.01) |
| *G02B 27/00* | (2006.01) |
| *G01S 7/481* | (2006.01) |
| *G01S 17/931* | (2020.01) |

(Continued)

(52) U.S. Cl.
CPC ................ *B60S 1/566* (2013.01); *B60S 1/26* (2013.01); *B60S 1/3404* (2013.01); *B60S 1/3495* (2013.01); *B60S 1/38* (2013.01); *G01S 7/4813* (2013.01); *G01S 17/931* (2020.01); *G02B 27/0006* (2013.01); *G01S 2007/4977* (2013.01)

(58) Field of Classification Search
CPC .... B60S 1/52; B60S 1/56; B60S 1/566; B60S 1/3404; B60S 1/26; B60S 1/60; B60S 1/603; G01S 17/931; G01S 7/4813; G01S 2007/4977; G02B 27/0006
USPC ............ 15/250.01, 250.3, 250.003, 250.002, 15/250.29

See application file for complete search history.

(56) References Cited

U.S. PATENT DOCUMENTS

| | | | |
|---|---|---|---|
| 3,704,481 | A | 12/1972 | Fennell |
| 8,864,392 | B2 | 10/2014 | Alexander et al. |

(Continued)

FOREIGN PATENT DOCUMENTS

| | | |
|---|---|---|
| CN | 103253209 A | 8/2013 |
| CN | 104797971 A | 7/2015 |

(Continued)

OTHER PUBLICATIONS

Machine translation of description portion of WO 2019/105723, published Jun. 2019. (Year: 2019).*

*Primary Examiner* — Gary K. Graham
(74) *Attorney, Agent, or Firm* — CANTOR COLBURN LLP (57) ABSTRACT

The apparatus for cleaning a surface comprises a housing for accommodating an object whose surface is to be cleaned, a wiper driving actuator adjacent the surface to be cleaned, the wiper driving actuator comprising an at least partially closed loop adapted to rotate about a longitudinal axis of the housing, and at least one wiper assembly operable by the wiper driving actuator to move along the at least partially closed loop and having a first end that is attached to the wiper driving actuator, the wiper assembly being movably mounted in the housing such that, in use, a constant distance is kept between the wiper assembly and the surface to be cleaned.

14 Claims, 5 Drawing Sheets

(51) Int. Cl.
  *B60S 1/26*  (2006.01)
  *G01S 7/497*  (2006.01)

(56) References Cited

U.S. PATENT DOCUMENTS

| | | |
|---|---|---|
| 9,380,190 B2 | 6/2016 | Pawlowski |
| 9,731,688 B2 | 8/2017 | Doorley et al. |
| 9,880,382 B1 | 1/2018 | Tippy et al. |
| 10,179,571 B1 | 1/2019 | Matesic et al. |
| 10,183,653 B2 | 1/2019 | Davies et al. |
| 10,259,431 B1 | 4/2019 | Ybarra et al. |
| 10,549,726 B2 | 2/2020 | Garcia Crespo et al. |
| 2014/0036132 A1 | 2/2014 | Pawlowski |
| 2015/0246660 A1 | 9/2015 | Seedall et al. |
| 2016/0121855 A1 | 5/2016 | Doorley et al. |
| 2016/0291134 A1 | 10/2016 | Droz et al. |
| 2017/0151933 A1* | 6/2017 | Doorley .................. B60S 1/56 |
| 2018/0015907 A1 | 1/2018 | Rice |
| 2018/0170319 A1 | 6/2018 | Schmidt |
| 2018/0319377 A1 | 11/2018 | Doorley et al. |
| 2022/0118946 A1* | 4/2022 | Hu ......................... B60S 1/566 |
| 2022/0203938 A1* | 6/2022 | Gilbertson ............... B08B 1/00 |

FOREIGN PATENT DOCUMENTS

| | | |
|---|---|---|
| CN | 106687342 A | 5/2017 |
| CN | 107107878 A | 8/2017 |
| CN | 107298074 A | 10/2017 |
| CN | 109249901 A | 1/2019 |
| DE | 202018103489 U1 | 7/2018 |
| GB | 2551006 A | 12/2017 |
| WO | WO 2019/105723 * | 6/2019 |

\* cited by examiner

APPARATUS FOR CLEANING A SURFACE

CROSS-REFERENCE TO RELATED APPLICATIONS

This application claims the benefit of European Application Serial No. 19382580.9 filed Jul. 8, 2019, the disclosure of which is incorporated herein by reference in its entirety.

FIELD OF THE INVENTION

The present disclosure relates to an apparatus for cleaning surfaces, and more particularly, an apparatus adapted to clean optical surfaces of motor vehicle parts.

BACKGROUND

In many applications, such as for example in sensor devices, optical surfaces must be kept clean for security reasons. For example, self-driving cars, also referred to as driverless, or autonomous cars, include a number of sensors for sensing the environment so as to move with little or no human input. Sensor devices used in self-driving cars are referred to as light detection and ranging (LiDAR) sensor devices.

LiDAR technology provides self-driving cars with high-resolution, three-dimensional information about the surrounding environment. Small lasers are employed with substantially 360° horizontal field of view suitable for creating accurate three-dimensional images of the surrounding environment. LiDAR sensor devices are usually mounted on the roof of motor vehicles and include motor means for rotating the LiDAR sensor 360° around itself so as to cover the entire environment. This allows positions of people and objects around the vehicle to be simultaneously located and the speed and route at which they are moving to be assessed. Self-driving cars are thus capable to determine the safest way for driving. The LiDAR sensor devices must be therefore clean and clear in order to achieve optimal image quality and proper and safe operation.

LiDAR sensor surfaces may be cleaned by a wiper system. Such wiper systems include a plurality of wiper blades configured to move around the dome in a first direction where the wiper blades are deployed into an upright position and in a second direction stowing the wiper blades into a collapsed position.

Known lens cleaning devices may include a housing, a cylindrical lens arranged inside the housing, an imager fitted therein, static wiping members in contact with an outer surface of the cylindrical lens, and a gear assembly coupling the cylindrical lens with a motor. The motor can be operated to rotate the cylindrical lens such that the static wiping members remove dust and debris from the cylindrical lens.

There still exists a need for simpler and efficient cleaning systems where the provision of a motor device does not involve taking up large space.

SUMMARY

The present disclosure refers to cleaning apparatuses, and more particularly to apparatuses configured to clean and dry curved optical surfaces in motor vehicles. Other applications are also possible.

In particular, an apparatus for cleaning a surface is provided comprising a housing suitable for accommodating therein an object whose surface is to be cleaned. The surface to be cleaned may be, for example, a curved, e.g. cylindrical, optical surface of a light detection and ranging (LiDAR) sensor device, a camera device, etc, preferably with a field of view of at least 210°, for example 270°.

The present surface cleaning apparatus is also provided with a wiper driving actuator for driving at least one wiper assembly attached thereto. The wiper driving actuator is positioned adjacent the surface to be cleaned. The wiper driving actuator comprises an at least partially closed loop, preferably a fully closed loop, arranged to rotate about a longitudinal axis of the housing. In one example, at least one wiper assembly is provided. In particular, the wiper assembly has a first end that is attached to the wiper driving actuator in a way that no relative movement exists therebetween so they move together along the at least partially closed loop. The wiper assembly is thus operable by the wiper driving actuator to move along the at least partially closed loop. A longitudinal axis of the wiper assembly is substantially parallel to the longitudinal axis of the optical surface to be cleaned.

Within the meaning of the present disclosure, a longitudinal axis refers to a geometric axis running through, or parallel to, the center of the housing along its longest dimension, that is, along a line running through the centers of the top and bottom surfaces of the object which lateral surface, arranged between said top and bottom surfaces, is to be cleaned. The same applies to the wiper assembly. As used herein, bottom surface refers to a surface of the object closest to a surface of the vehicle where the object is mounted, while top surface refers to a surface arranged opposite the bottom surface.

The partially closed loop in the wiper driving actuator may be, for example, a ring gear that is movably mounted in the housing. Said ring gear may be arranged to rotate about the longitudinal axis of the housing to drive the wiper assembly, as it will be described further below, over the surface to be cleaned. The partially closed loop, or ring gear, may be arranged substantially concentric to the curved optical surface to be cleaned.

The wiper assembly is movably mounted in the housing such that, in use, a constant distance is kept between the wiper assembly and the surface to be cleaned. The wiper assembly may comprise a wiper blade, e.g. having a substantially rectilinear, or straight configuration, and a wiper blade support configured to support the wiper blade. The wiper blade may be arranged at least substantially parallel to the longitudinal axis of the housing. The length of the wiper blade is suitable to sweep an entire operating optical surface to be cleaned. The wiper blade is substantially rigid so large deformations do not occur. The wiper blade support may be attached to, or be part of, the wiper driving actuator. The wiper blade support is arranged to support the wiper blade in a substantially vertical position, or in a position parallel to the surface to be cleaned, at all times.

The wiper assembly is thus configured to rotationally clean the optical surface as the wiper assembly rotates, as it will be described further below. In particular, the wiper driving actuator may be operable to move the wiper blade according to either a first direction of rotation, or a second opposite direction of rotation, or according to both a first and a second opposite directions of rotation.

Motor means, such as for example an electrical motor, are also provided. The motor means are arranged to drive the wiper driving actuator, in particular to drive the partially closed loop, or ring gear, so as to move the wiper assembly around the longitudinal axis of the housing.

A drive transmission may be arranged between the motor means and the partially closed loop, or ring gear, to mechanically adapt the rotational speed of the motor means as desired to suitably drive the wiper assembly in operation. The drive transmission may comprise a set of gears. In other examples the drive transmission may comprise at least one belt. Still in other examples, no drive transmission is provided such that the motor means is directly coupled to the ring gear.

The housing may comprise a first housing portion where the wiper driving actuator is located. The first housing portion is arranged at least partially circumferentially around the optical element. The first housing portion comprises a surface on which the partially closed loop, or ring gear, of the wiper driving actuator is located.

The housing may comprise a second housing portion that may be adapted for receiving the motor means. The longitudinal axis of the housing may be thus at least substantially parallel to the longitudinal axis of the second housing portion. In a given position of the wiper assembly, at least a central portion of the wiper assembly is positioned between the surface to be cleaned and said second housing portion.

The housing may further comprise a third housing portion that may be arranged opposite to the first housing portion. The third housing portion may have a guiding member configured for receiving one end of the wiper assembly therein. Thus, each wiper assembly blade may have a first end attached to the partially closed loop, or ring gear, of the wiper driving actuator so as to rest on the first housing portion, and a second end attached to said guiding member in the third housing portion. Thus, as the partially closed loop, or ring gear, is rotated, the wiper blade rotates with it. A top cover may be integrated, or provided in the third housing portion, to improve the aesthetics of the cleaning device.

The second housing portion may comprise a first end and a second opposite end. The first end of the second housing portion may be attached to the first housing portion and the second opposite end of the second housing portion may be attached to the third housing portion. The wiper assemblies may be arranged to extend from the first housing portion to the third housing portion.

Washing fluid injecting means may be also provided comprising a source of washing fluid, at least one washing fluid inlet, at least one washing fluid outlet, and at least one nozzle, such as for example, four, fitted in the washing fluid outlets for injecting washing fluid towards the surface to be cleaned. The nozzle may be arranged to eject fluid in a direction substantially parallel to the longitudinal axis of the housing, or in a direction at an angle at least less than 30° relative to the longitudinal axis of the housing, and thus in a direction at an angle to the surface of the surface to be cleaned. This advantageously avoids the use of a fluid receiving dish so complexity and costs are reduced.

A vision assembly is also provided herein. The vision assembly comprises the apparatus described above and an optical device as the object whose surface is to be cleaned. A vision system is also provided comprising at least two vision assemblies as described above. The second housing portion of each cleaning apparatus are positioned substantially facing one another. In one example, the optical device may be a light detection and ranging (LiDAR) sensor device.

The particular configuration of the present apparatus for cleaning a surface where washing fluid is injected towards an optical surface, or lens, through nozzles while a wiper assembly is rotated has been shown to be very efficient for cleaning and drying an optical surface, or lens. With the present cleaning apparatus, problems related to dirtiness on an optical sensor surface are efficiently overcome. This is achieved through a very small sized cleaning apparatus due to the arrangement of the wiper assembly motor means arranged on one side of the optical surface to be cleaned, such as inside the second housing portion. The overall height of the apparatus is thus advantageously reduced so improved aerodynamics is achieved.

The motor means to drive the wiper driving actuator are preferred to be located adjacent the perimeter of the LiDAR sensor device where no optical area is provided. For example, where the LiDAR sensor device has an optical area smaller than 360°, such as for example a 270° optical area, then the motor means are located in an area within the remainder 90°. Cleaning apparatus integration including water injection and wiper assembly in the same mechanism advantageously results in assembly into vehicle to be easier.

The present apparatus for cleaning a surface takes advantage of specific applications where LiDAR sensor devices are arranged on a vehicle roof where a 360° field of view can not be captured. With the particular configuration of the present cleaning apparatus in which motor means are arranged adjacent the optical surface to be cleaned, usually in a pillar that covers a portion of the LiDAR sensor device field of view, space occupied by the electric motor and the drive transmission is minimum so impact on vehicle aesthetics highly reduced, especially on the vehicle interior as compared to prior art cleaning apparatuses where the motor means are typically located under the roof, under the LiDAR sensor device, inside the vehicle.

BRIEF DESCRIPTION OF THE DRAWINGS

A non-limiting example of the present disclosure will be described in the following, with reference to the appended drawings, in which.

DETAILED DESCRIPTION OF EXAMPLES

An apparatus 100 for cleaning an optical surface 210 of a light detection and ranging (LiDAR) sensor device 200 is shown in the non-limiting example illustrated in the FIGS. 1-4 of the drawings. The cleaning apparatus 100 comprises a housing 300 inside of which the LiDAR 200 is accommodated. The optical surface 210 of the LiDAR 200 to be cleaned is cylindrical in shape and is adapted to provide a field of view of at least 270°.

Figure 2:
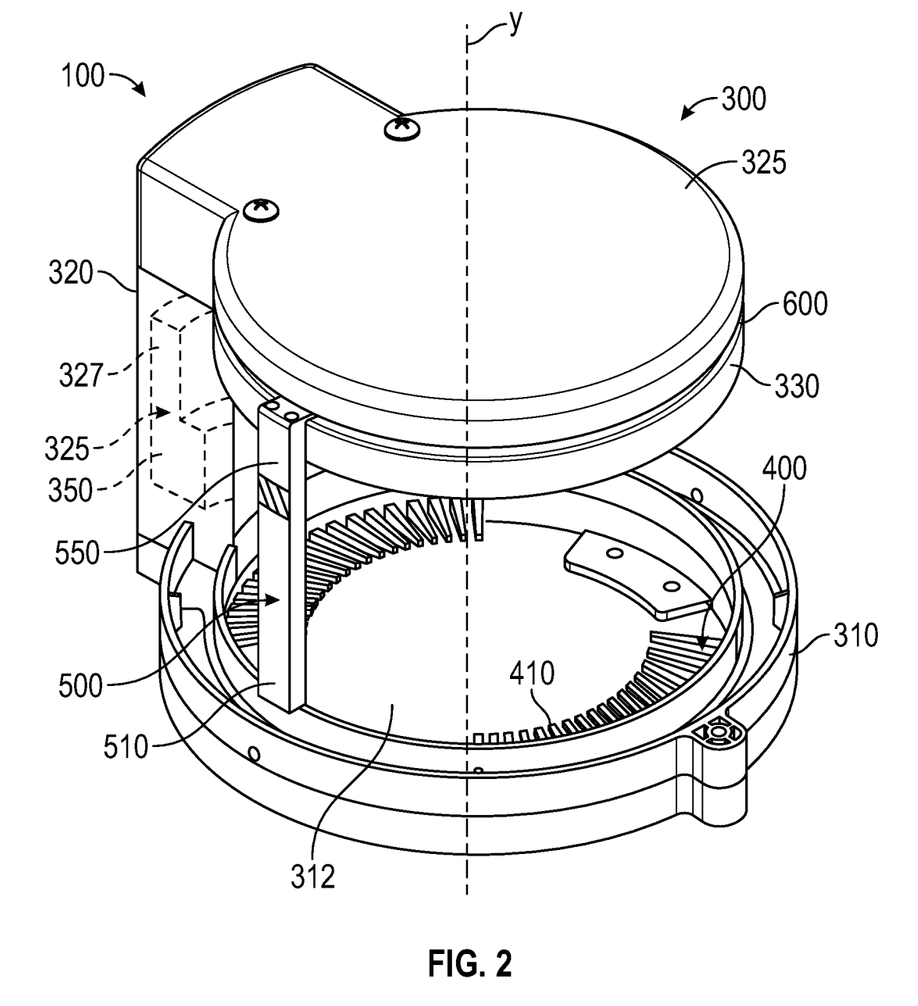
FIG. 2 is a general perspective view of the example of the cleaning apparatus in which the LiDAR sensor device has been removed to see internal parts of the cleaning apparatus.

Reference is now made to FIG. 2, where a wiper driving actuator 400 is shown arranged adjacent the optical surface 210 of the LiDAR 200. The wiper driving actuator 400 is intended to drive a wiper assembly 500. The wiper assembly 500 is attached to the wiper driving actuator 400 through a lower end 510 thereof in a way that no relative movement exists therebetween. Thus, the wiper assembly 500 and the wiper driving actuator 400 move together in rotation. As shown in the figures, the wiper assembly 500 is arranged substantially parallel to the longitudinal axis y of the housing 300.

The wiper driving actuator 400 comprises at least a partially closed loop 410 shown in FIG. 2 arranged substantially concentric to the curved optical surface 210 of the LiDAR 200. The partially closed loop 410 is arranged to rotate about the longitudinal axis y of the housing 300. In the example shown, the partially closed loop is a ring gear 410 arranged at the bottom of the housing 300. The ring gear 410 can be thus driven to move the wiper assemblies 500 over the optical surface 210 of the LiDAR 200 so as to rotationally clean it as they are rotated. A constant distance is kept during operation between the wiper assemblies 500 and the optical surface 210 of the LiDAR 200.

The wiper assembly 500 comprises a wiper blade, not shown, arranged at least substantially parallel to the longitudinal axis y of the housing 300. The wiper blade comprises a straight, or at least substantially rectilinear, body made from a substantially rigid material so as to reduce occurrence of deformations. The length of the wiper blade is suitable to sweep substantially the entire surface 210 of the LiDAR 200.

The longitudinal axis y is thus substantially parallel to the surface 210 of the LiDAR 200 to be cleaned especially when the surface 210 of the LiDAR 200 is cylindrical. When the surface 210 of the LiDAR 200 is dome shaped, the geometry of the wiper blade is substantially curved. Also, the longitudinal axis y is perpendicular to the first and second housing portions 310, 330 and parallel to a longitudinal axis of the second housing portion 320 and the wiper blade 500. Also, the longitudinal axis y is substantially perpendicular to the above mentioned ring gear 410. A constant distance is kept between the wiper assembly 500 and the longitudinal axis y.

The wiper assembly 500 also comprises a wiper blade support 550 that is attached to, or is part of, the rotatable ring gear 410. The wiper blade support 550 is configured to support the wiper blade in a substantially vertical position when mounted in a motor vehicle roof 900, as stated above, that is, in a position substantially perpendicular to the surface of the vehicle where the LiDAR 200 is mounted and substantially parallel to the longitudinal axis y of the housing 300. In any case, the wiper blade support 550 is configured to support the wiper blade in a position substantially parallel to the optical surface 210 of the LiDAR 200 at all times as it is rotated around the longitudinal axis y of the housing 300.

Figure 4:
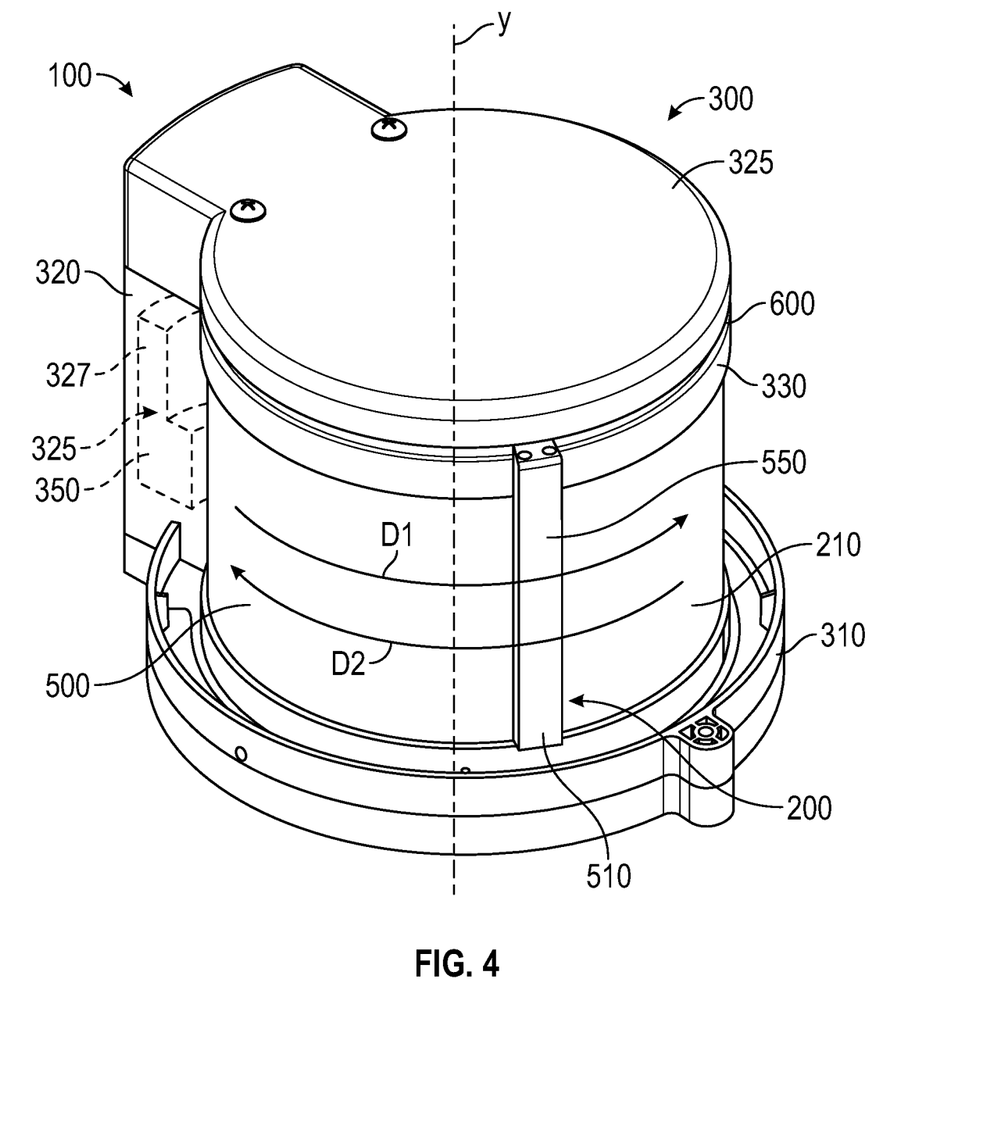
FIG. 4 is a general perspective view of the example of the cleaning apparatus in operation in which the LiDAR sensor device has been illustrated and where operation of a wiper assembly is shown.

The wiper driving actuator 400 is operable to move the wiper assemblies 500 so as to clean and dry the optical surface 210 of the LiDAR 200 through the wiper blades according to either a first direction of rotation D1, or a second opposite direction of rotation D2, or according to both a first and a second opposite directions of rotation D1, D2, as shown in FIG. 4.

Figure 1:
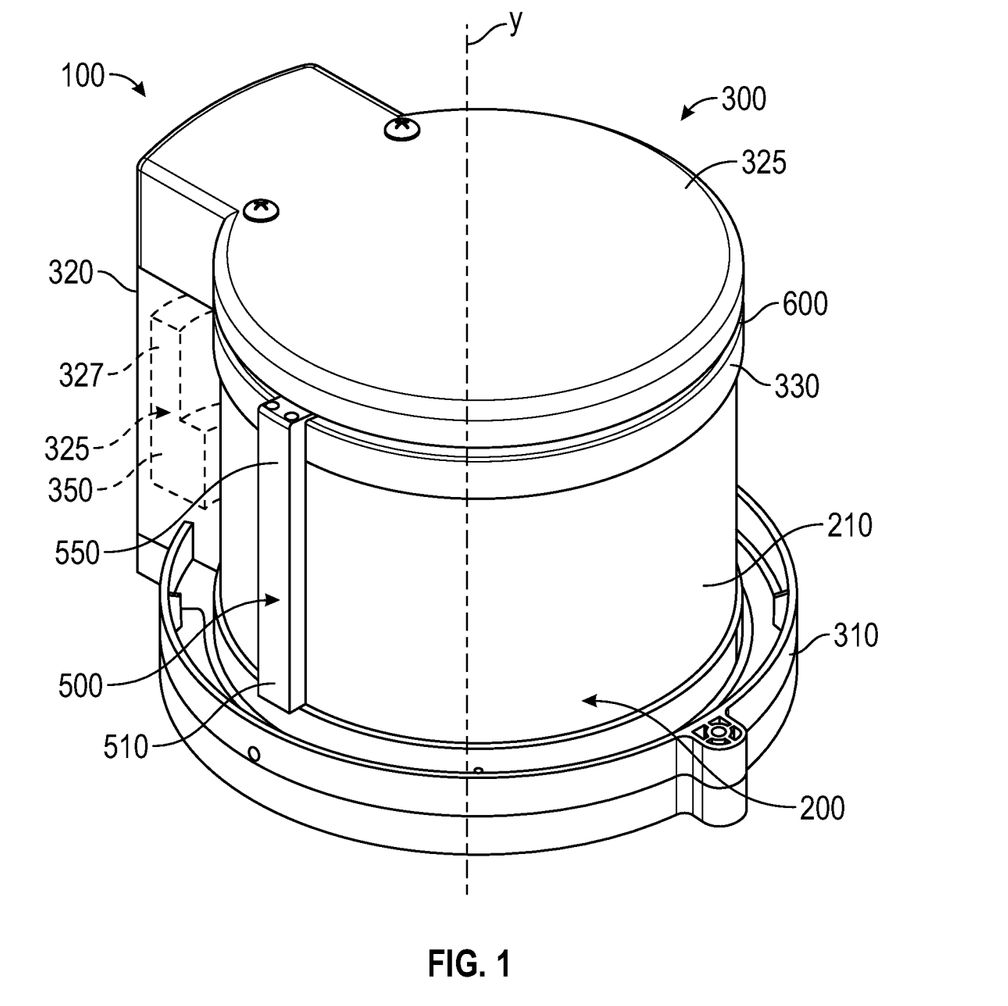
FIG. 1 is a general perspective view of one example of the present apparatus for cleaning a surface of a LiDAR sensor device in which the LiDAR is illustrated.
Figure 3:
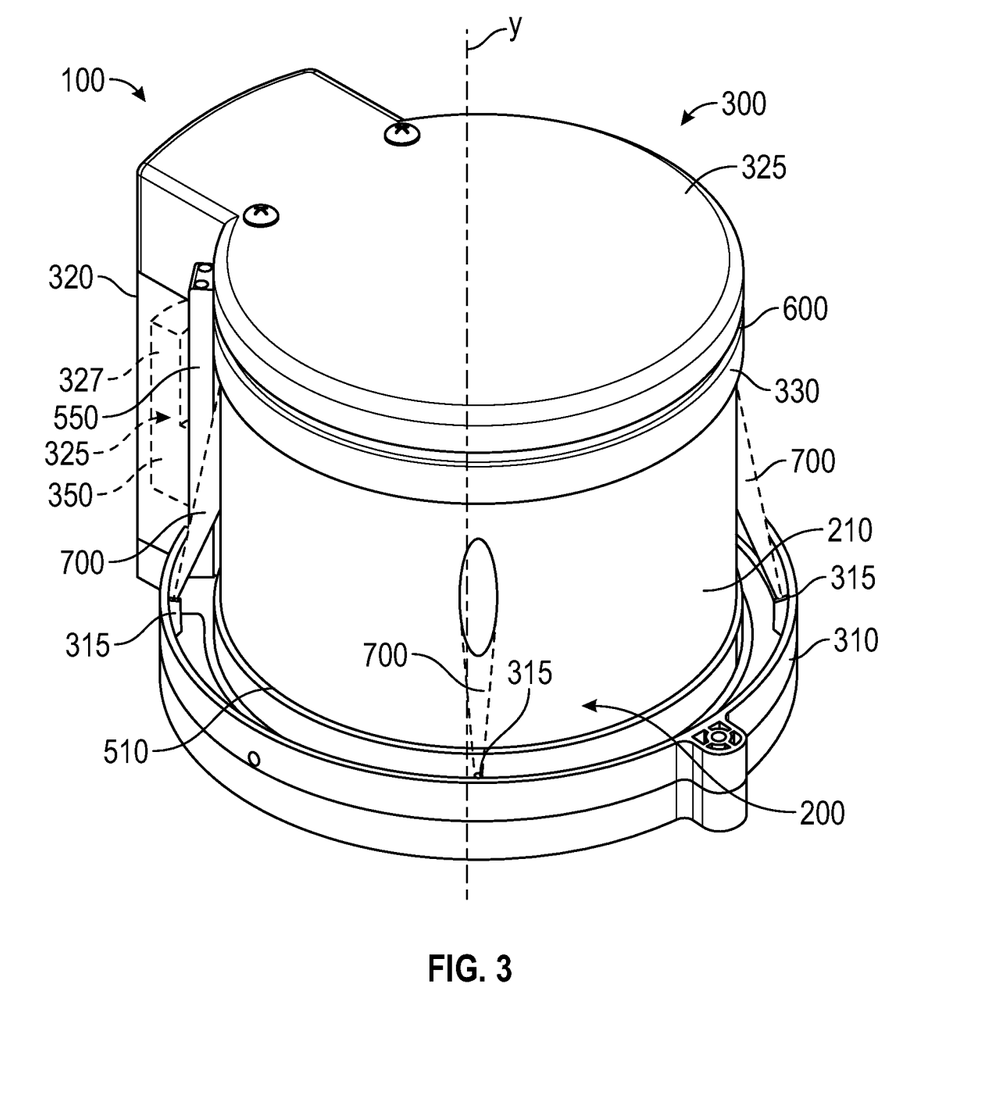
FIG. 3 is a general perspective view of the example of the cleaning apparatus in operation in which the LiDAR sensor device has been illustrated and where washing fluid streams are shown.

As shown in FIGS. 1, 3 and 4 of the drawings, the housing 300 comprises a first housing portion 310 arranged at the bottom of the cleaning apparatus 100, circumferentially around the optical surface 210 of the LiDAR 200, and configured to receive the wiper driving actuator 400. The first housing portion 310 has an upper surface 312 on which the ring gear 410 rests.

In said example, the housing 300 also comprises a second housing portion 320 extending towards the top of the housing 300 and configured to receive a motor means 325 including an electric motor 327 therein. The second housing portion 320 is suitable to prevent water, or other foreign material, from reaching the electrical motor 327. The second housing portion 320 is located adjacent the perimeter of the optical element 200 not having an operating optical area, in particular in a space between the first housing part 310 and the third housing part 330. Where the optical element 200 has an operating optical area smaller than 360°, for example, if the optical element 200 has a 270° operating optical area, then the electrical motor 327 is located in an area of the remainder 90°.

Also in the example shown, the housing 300 further comprises a third housing portion 330 arranged opposite to the first housing portion 310 at the top of the cleaning apparatus 100. The third housing portion 330 includes therein a guiding member 600. An upper end of the wiper blade runs along said guiding member 600. Thus, as the ring gear 410 is rotated, the wiper blade rotates with it. A top cover 325 is provided on the third housing portion 330 to improve the aesthetics of the cleaning apparatus 100.

The second housing portion 320 has a first end attached to the first housing portion 310 and a second opposite end attached to the third housing portion 330. The wiper assemblies 500 are arranged extending from the first housing portion 310 to the third housing portion 330.

As stated above, motor means, not shown, are provided in the second housing portion 320. The motor means 325 includes electrical motor 327 suitable for driving the ring gear 410 so as to move the wiper assemblies 500 to rotate about the longitudinal axis y of the housing 300. The ring gear 410 is coupled to the electrical motor 327 through a drive transmission 350, and is in turn engaged to the wiper assembly 500. The drive transmission 350 comprises a set of gears, not shown, suitable to mechanically adapt the rotational speed of the electrical motor 327 to suitably drive the wiper assembly 500 in operation according to either a first direction of rotation D1, or a second opposite direction of rotation D2, or according to both a first and a second opposite directions of rotation D1, D2. The electrical motor 327 and the drive transmission 350 are advantageously integrated with and arranged adjacent to the LiDAR 200.

In use, streams 700 of washing fluid, as shown in FIG. 3 of the drawings, are injected from fluid outlets 315 formed in the first housing portion 310. Cases where fluid outlets 315 are formed in the second housing portion 320 are also possible. Each fluid outlet 315 include a nozzle configured such that washing fluid streams 700 are directed towards the optical surface 210 at an angle at least less than 30° relative to the longitudinal axis y of the housing 300 and thus at an angle to the surface 210 of the LiDAR 200.

Figure 5:
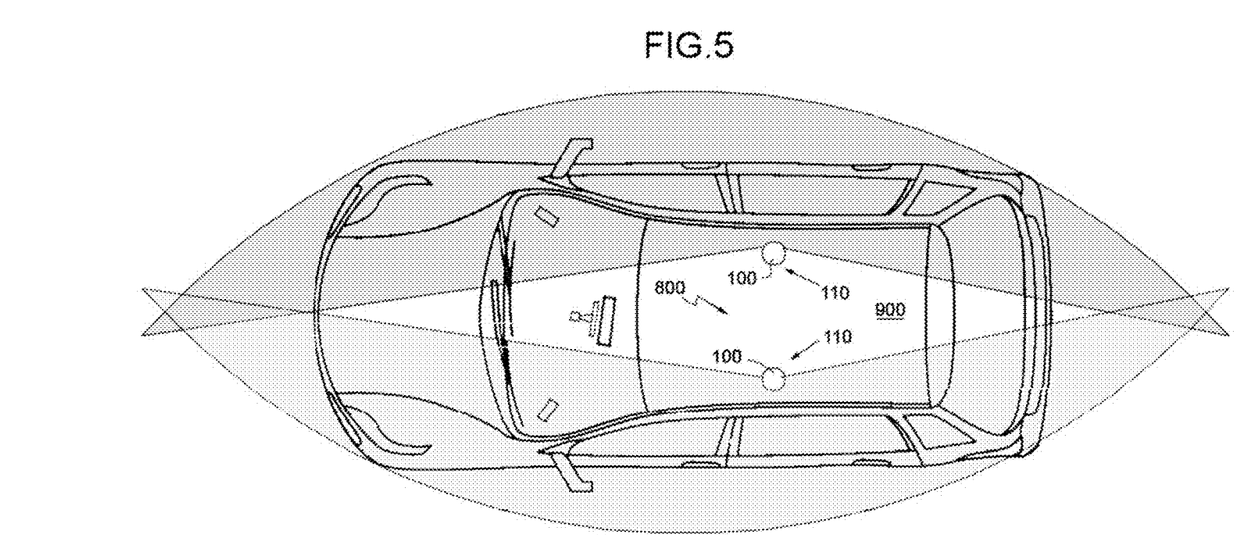
FIG. 5 is a top plan view of a motor vehicle where the present vision system is provided.

A vision assembly 110 may include the cleaning apparatus 100 described above and a light detection and ranging (LiDAR) sensor device 200. A vision system 800, shown in FIG. 5, includes two of such vision assemblies 110, where the respective second housing portions 320 in each cleaning apparatus 100 are positioned substantially facing one another. However, the LiDAR sensor devices 200 may be located at different positions such as for example one at a vehicle front portion and another on a vehicle rear portion, either on the roof 900, in front and rear vehicle bumpers, etc. In any case, the second housing portions 320 of the cleaning apparatuses 100 in the vision system 800 are positioned facing one another.

While the present disclosure has been described with reference to an exemplary embodiment or embodiments, it will be understood by those skilled in the art that various changes may be made, and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

The invention claimed is:

1. Apparatus for cleaning a surface, the apparatus comprising:
    a housing including a first housing portion, a second housing portion, and a third housing portion, the second housing portion linking the first housing portion and the third housing portion;
    a surface to be cleaned arranged between the first housing portion and the third housing portion;
    a wiper driving actuator arranged in the first housing portion, the wiper driving actuator being positioned adjacent the surface to be cleaned, the wiper driving actuator comprising an at least partially closed loop adapted to rotate about a longitudinal axis of the housing defined between the first housing portion and the third housing portion;
    a motor means arranged in the second housing portion, the motor means being operatively connected to the wiper driving actuator; and
    a wiper assembly operable by the wiper driving actuator to move with the at least partially closed loop, the wiper assembly having a first end that is attached to the wiper driving actuator, the wiper assembly being movably mounted in the housing such that, in use, a constant distance is kept between the wiper assembly and the surface to be cleaned.

2. The apparatus of claim 1, wherein the motor means includes an electric motor mounted in the second housing portion.

3. The apparatus of claim 1, wherein the third housing portion is adapted to guide a second end of the wiper assembly.

4. The apparatus of claim 1, wherein the partially closed loop is a ring gear movably mounted in the first housing portion, and wherein the motor means are configured to drive the ring gear so as to move the wiper assembly around the longitudinal axis of the housing.

5. The apparatus of claim 1, wherein further comprising a drive transmission is mechanically arranged between the motor means and the wiper driving actuator.

6. The apparatus of claim 1, wherein further comprising a drive transmission is mechanically arranged between the motor means and the wiper driving actuator.

7. The apparatus of claim 1, wherein the wiper assembly is arranged to extend between the first housing portion to the third housing portion.

8. The apparatus of claim 1, wherein the wiper assembly comprises a wiper blade and a wiper blade support configured to support the wiper blade.

9. The apparatus of claim 1, wherein the wiper blade is arranged at least substantially parallel to the longitudinal axis of the housing.

10. The apparatus of claim 1, further comprising a washing fluid injecting means including at least one fluid inlet and at least one fluid outlet for injecting washing fluid towards the surface to be cleaned.

11. The apparatus of claim 10, wherein the fluid outlet is arranged to eject a washing fluid stream in a direction at an angle at least less than 30° relative to the longitudinal axis of the housing.

12. The apparatus according to claim 10, wherein the washing fluid injecting means includes an injector mounted relative to the first housing portion.

13. The apparatus of claim 1, wherein the wiper driving actuator is operable to move the wiper assembly in one of a first direction of rotation, a second direction of rotation opposite the first direction of rotation, and in each the first and a second directions of rotation.

14. A vision system comprising:
    a plurality of vision assemblies each including the cleaning apparatus as claimed in claim 1; and
    an optical device including a surface to be cleaned, wherein the second housing portion of each cleaning apparatus is positioned substantially facing one another.

* * * * *